United States Patent [19]

Richardson et al.

[11] 4,330,037

[45] May 18, 1982

[54] WELL TREATING PROCESS FOR CHEMICALLY HEATING AND MODIFYING A SUBTERRANEAN RESERVOIR

[75] Inventors: Edwin A. Richardson, Houston, Tex.; Walter B. Fair, Jr., Slidell, La.

[73] Assignee: Shell Oil Company, Houston, Tex.

[21] Appl. No.: 215,895

[22] Filed: Dec. 12, 1980

[51] Int. Cl.³ .............. E21B 43/22; E21B 43/24; E21B 47/00

[52] U.S. Cl. .................. 166/250; 166/300; 166/302; 166/303

[58] Field of Search ........... 166/250, 270, 279, 300, 166/302, 303, 305 R, 312

[56] References Cited

U.S. PATENT DOCUMENTS

| | | | |
|---|---|---|---|
| 2,124,495 | 7/1938 | Miller | 166/312 |
| 2,889,884 | 6/1959 | Henderson et al. | 166/300 X |
| 3,129,760 | 4/1964 | Gambill | 166/300 |
| 3,532,165 | 10/1970 | Raifsnider et al. | 166/270 |
| 3,712,380 | 1/1973 | Caffey | 166/300 |
| 4,178,993 | 12/1979 | Richardson et al. | 166/300 |
| 4,219,083 | 8/1980 | Richardson et al. | 166/300 |

*Primary Examiner*—Stephen J. Novosad
*Assistant Examiner*—George A. Suchfield

[57] ABSTRACT

A portion of a subterranean oil and water-containing reservoir is concurrently chemically heated and selectively increased in its effective permeability to oil by injecting a solution of compounds containing ammonium ions and nitrite ions, which react exothermically to generate gaseous nitrogen, and a reaction-rate-controlling buffer. The reactant concentration and the rate at which the solution is injected are arranged to provide a selected temperature increase within a selected portion of the reservoir.

5 Claims, 6 Drawing Figures

WELL TREATING PROCESS FOR CHEMICALLY HEATING AND MODIFYING A SUBTERRANEAN RESERVOIR

BACKGROUND OF THE INVENTION

This invention relates to a well treating process for increasing the relative mobility of the oil within a near well portion of a reservoir. More particularly, the invention relates to treating a selected zone within an oil and water-containing reservoir by chemically heating that portion to a selected temperature in a manner which concurrently increases its effective permeability to oil.

U.S. Pat. No. 4,178,993 by E. A. Richardson and R. F. Sherman describes a well treating process for initiating fluid production by injecting an aqueous solution containing nitrogen-gas-generating reactants having a concentration and rate of reaction correlated with the pressure and volume properties of the reservoir and the well conduits to react at a moderate rate within the well and/or the reservoir to generate enough gas to displace sufficient liquid from the well to reduce the hydrostatic pressure within the well to less than the fluid pressure within the reservoir.

The present invention involves injecting an aqueous solution which contains particular ones of the same nitrogen-gas-generating reactants and has a reaction rate correlated with the well and reservoir properties in a way that is generally similar to that described in U.S. Pat. No. 4,178,993. But, the present invention utilizes a concentration of gas-generating reactants and reaction rate-controlling materials which are correlated with the rate at which the solution is injected into the well and reservoir in a way which is productive of a different result within the reservoir. The present invention utilizes a discovery that the specified gas-forming reactants can be arranged and injected so that they both heat a selected zone to a selected temperature and, concurrently, increase the relative magnitude of the effective permeability to oil within a treated portion of an oil and water-containing reservoir.

U.S. Pat. No. 4,219,083 by E. A. Richardson and R. F. Sherman describes a process for cleaning well casing perforations by injecting an aqueous solution containing nitrogen-gas-generating reactants, an alkaline buffer providing a reaction-retarding pH and an acid-yielding reactant which subsequently overrides the buffer and lowers the pH in order to trigger a fast-rising pulse of heat and pressure which causes perforation-cleaning backsurge of fluid through the perforations.

Patent application Ser. No. 062,204 filed July 30, 1979, now U.S. Pat. No. 4,232,741 by E. A. Richardson, R. F. Sherman, D. C. Berkshire, J. Reisberg and J. H. Lybarger describes a process for temporarily plugging thief zones within a reservoir by injecting an aqueous solution containing nitrogen-gas-generating reactants, a foaming surfactant, an alkaline buffer and an acid-yielding reactant, arranged so that they initially delay the reaction and subsequently initiate a moderate rate of gas production, in order to form a foam which is, temporarily, substantially immobile within the reservoir formation.

Patent application Ser. No. 127,355 filed Mar. 5, 1980, by D. R. Davies and E. A. Richardson describes a process for conducting a production test by circulating a solution of nitrogen-gas-generating reactants within conduits within a well, with the solution buffered at a pH providing a promptly-initiated reaction having a relatively mild rate, and being inflowed through a conduit at a rate such that the gas which it generates serves as a lift gas for gas-lifting fluid from the reservoir through another conduit within the well.

SUMMARY OF THE INVENTION

The present invention relates to a well treating process for treating a selected zone within an oil and water-containing subterranean reservoir by heating it to a selected temperature while concurrently increasing the relative magnitude of its effective permeability to oil. Selections are made of (a) a volume of aqueous liquid which is at least sufficient to fill substantially all of the water-occupied volume of the selected zone and (b) a fluid flow rate at which the selected volume of liquid can be flowed through the well and into the reservoir without requiring an undesirably long time or damaging the well or the reservoir. An aqueous liquid solution is compounded in a volume substantially equalling the selected volume so that in substantially every portion of the solution there is enough dissolved heat and nitrogen-gas-generating reactants to heat such portion to a temperature exceeding the selected heating temperature. The reactants used are selected so that they consist essentially of (a) at least one each of water-soluble ammonium ion-containing and nitrite ion-containing compounds which react exothermally while generating nitrogen gas and (b) at least one buffering material for maintaining a pH which controls the rate of that reaction. Each portion of the solution is buffered at a pH which is arranged so that, when the solution is flowed through the well and into the reservoir at the selected rate, the rate of reaction within each portion of the solution causes at least most of the gas and heat which it can generate to be generated after, but relatively soon after, that portion that has reached a selected depth. That solution is flowed through the well and into the reservoir at substantially the selected rate of flow so that at least most of the gas and heat are generated below the selected depth and are transmitted into the selected zone within the reservoir to heat that zone to substantially the selected heating temperature.

DESCRIPTION OF THE INVENTION

Figure 1:
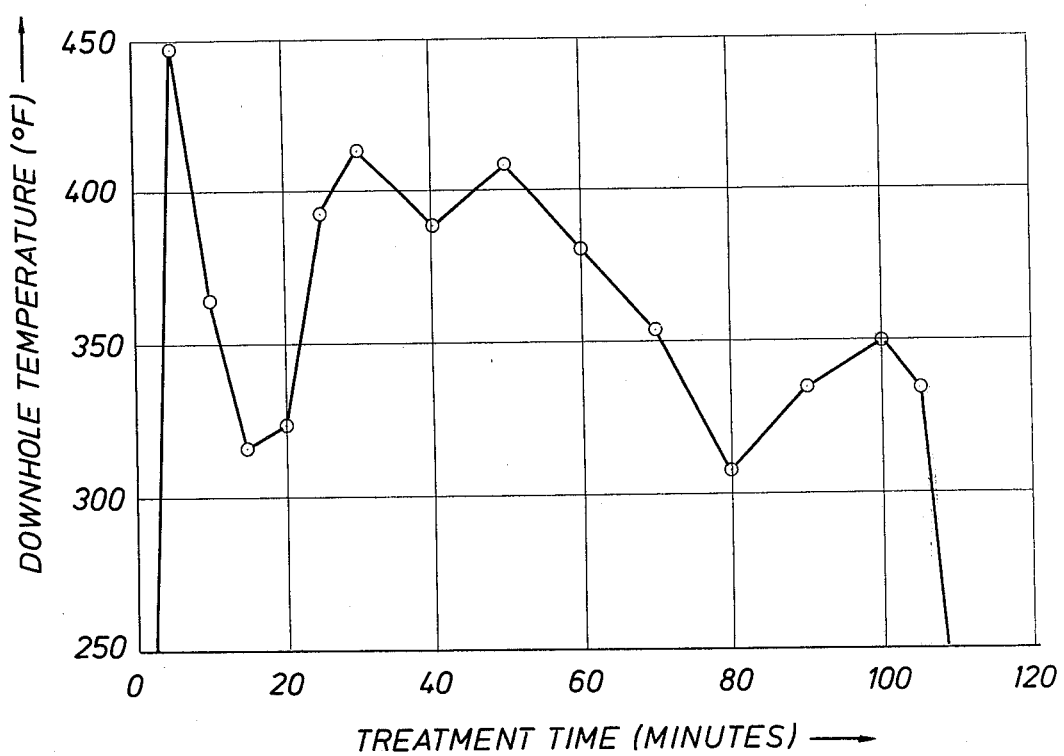
FIG. 1 shows the variation with time of the temperature of a well being treated in accordance with the present invention.

This invention is, at least in part, premised on a discovery that many, if not all, water-soluble ammonium ion-containing and nitrite ion-containing compounds can be dissolved in aqueous solutions which can be injecting into a well and can generate about 70 kilocalories and 1 mole of gaseous nitrogen for each mole of the ammonium and nitrite ions that react. The relatively high water solubility of such compounds makes it feasible to dissolve the ammonium ion-containing compounds and nitrite ion-containing compounds in separate solutions which can be mixed just before they enter the well, e.g., by pumps at the well site. The resulting mixtures can provide heat and nitrogen-generating solutions that yield from about 1 to 5 moles per liter of nitrogen gas even where the individual solutions are mixed in equal parts and thus must contain from about 2 to 10 moles per liter of the respective reactants. Laboratory and field tests have indicated the feasibility of heating the materials encountered in and around the borehole of the well while controlling the reactant concentrations and the rates at which they react as well as the rates of injecting such solutions through a well and into an earth formation so that the location in which the heat is generated is controlled by the rates that are used.

In treating a production well which had been producing (by means of gas-lift) a relatively viscous oil at a rate of about 4 barrels of oil and 200 barrels of water per day, it was discovered that the present treatment dramatically increased the relative rate of oil production without significantly changing the rate of total fluid production. About 100 barrels of the present treating solution was injected and after a 3-day soak time, the well was returned to production. That treatment increased the oil production rate to about 80 barrels per day without significantly changing the rate of total fluid production. And, unobviously, the high relative rate of oil production continued for longer than could be expected due to the amount of heat and/or gas that was injected.

As indicated above, the present invention is related to the one described in U.S. Pat. No. 4,178,993. Both inventions relate to treating a well by injecting an aqueous solution containing nitrogen-gas-generating reactants and buffering materials for controlling the time of onset of a moderate rate of the gas generation. However, due to differences in which reactants are used, the reactant concentrations and the correlations between the rate of the gas-generating reaction and the rates at which the reactive solutions are flowed through the well and into the reservoir, the results provided by the present invention are distinctly different from those provided by the prior invention. The prior invention gas-lifts enough liquid to initiate production from a well from which production is prevented by the magnitude of the hydrostatic head within the well. The present invention selectively heats a selected zone within a reservoir, without heating any other portion of the well or reservoir—while concurrently increasing the effective permeability to oil in a manner that is not explainable by the mere amount of gas and heat that are injected.

I-Well Treatment

The present invention was used in a well which was producing a relatively viscous oil (having a viscosity of about 300 cp at the reservoir temperature of about 92° F.) from a reservoir that was about 16 feet thick and was located at a depth of about 1350 feet. The treating solution used was prepared by mixing substantially equal portions of solutions A and B; which were compounded as follows:

Solution A (50 bbls)
1. Place 42 bbls fresh water in clean tank.
2. Add 7300 lbs sodium nitrite while agitating.
3. Mix thoroughly to dissolve.

Solution B (50 bbls)
1. Place 32 bbls fresh water in clean tank.
2. Add 8500 lbs ammonium nitrate while agitating.
3. Add 600 lbs sodium acetate while agitating.
4. Add 35 gals. of 37% HCl while agitating.
5. Add 32 lbs. of citric acid while agitating.
6. Add 10.5 gals. A-186 inhibitor (available from Dowell)
7. Mix thoroughly to dissolve.

The treating solution formed by combining solutions A and B was (stoichiometrically) capable of generating about 13 million BTUs and 50,000 SCF of nitrogen gas within the reservoir. It was expected to permeate the highly permeable (3-4 darcy) reservoir for a radius of about 10 feet from the wellbore and to heat that zone to about near 400° F.

The well being treated had previously been produced for about 6 years and was classified as stripper production. An attic gas injection drive had been attempted without significant success. A hot water soak had been performed in the well and had only temporarily increased the production rate from about 20 to about 50 barrels of oil per day. Shortly prior to the treatment in accordance with the present invention, the well tested 4 BOPD and 177 BWPD and was considered near economic depletion. Its cumulative production was in the order of 35 million barrels of oil, 25 million cubic feet of gas and 415 million barrels of water.

Since the prior hot water soak treatment had injected 200,000 million BTUs and the present invention treatment was only designed to generate about 13 million BTUs (being designed to be restricted to the near bore region), it was anticipated that the incremental amount of oil it produced would be in the order of 2,000 barrels.

FIG. 1 shows the variation with time in the temperature measured at 1325 feet while the well was being treated in accordance with the following:

1. Pump 100 barrels of specified treatment at 1 BPM rate.
2. Displace tubing with 10 barrels of filtered saltwater. (NOTE: This will slightly overdisplace chemical treatment.)
3. Rig down and release pumping unit.
4. Leave well shut in for 3 days, then open to production and test. Send tests on morning reports.

Following the treatment it was found that the oil rate immediately jumped to about 80 barrels per day, remained at from about 60 to 90 barrels per day with about 70 to 150 barrels of water per day and about 500 SCF per barrel of oil of formation gas for about 2 months. Three months after the treatment the well tested at 30 BOPD. The cumulative production was increased by about 5000 barrels of oil.

II-Laboratory Tests of Reaction Rates

Figure 2:
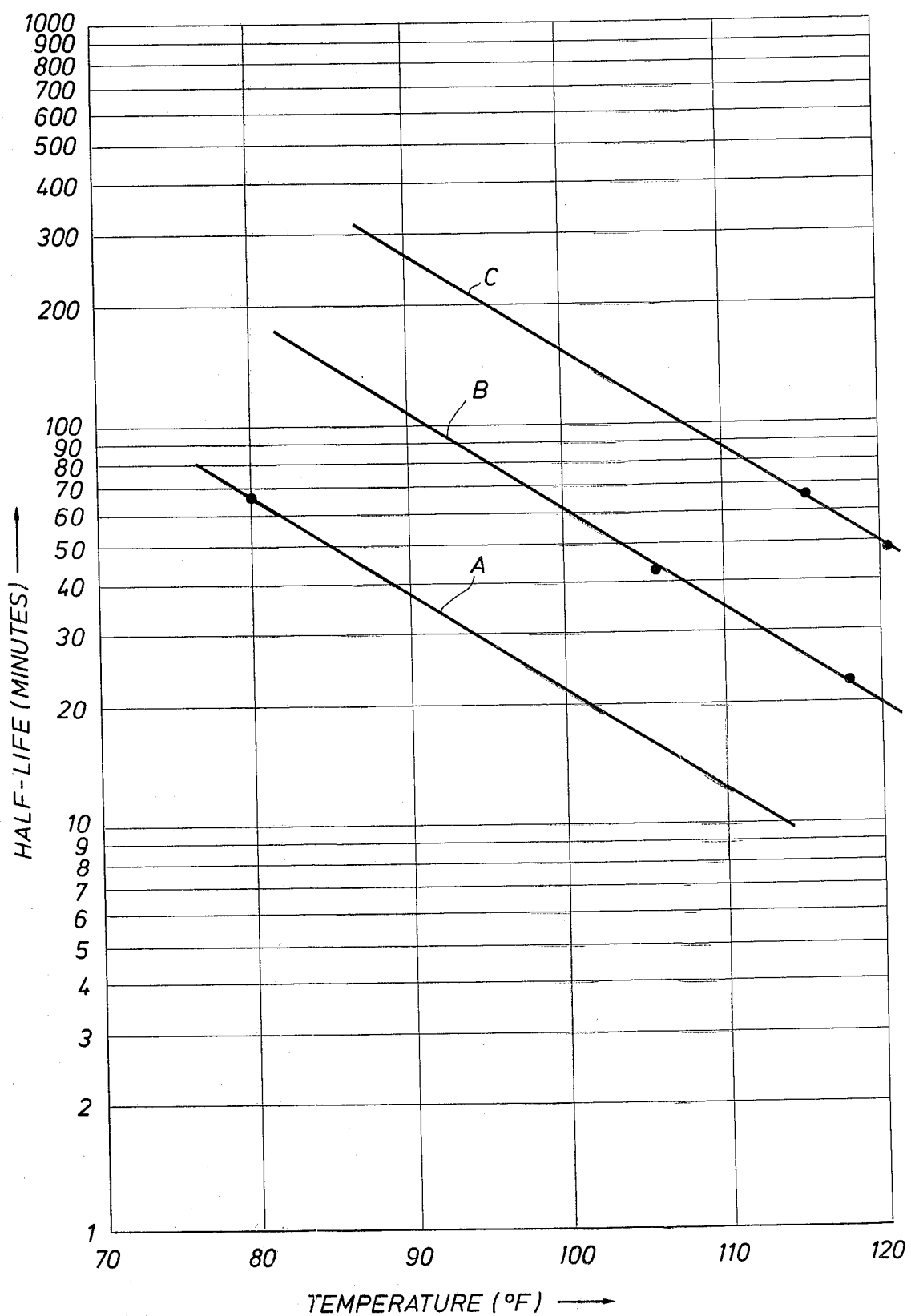
FIGS. 2 and 3 illustrate the variations with temperature for the reaction half-lifes of various solutions suitable for use in the present invention.

FIG. 2 shows plots of the half-lifes versus temperature for three solutions containing interreacting ammonium ions and nitrite ions. In each case the reactants were dissolved in distilled water, in the concentrations indicated below. About 100 cc portions of the solutions were maintained isothermally at the indicated temperatures in a water bath capable of removing the reaction-generated heat substantially as soon as it formed and thus maintaining the solutions at the indicated temperature.

In terms of moles per liter, the reactants in the solutions relating to curves A, B and C were:

Curve A: 3 m sodium nitrite; 3 m ammonium nitrate; 0.2 m sodium acetate; 0.1 m hydrogen ion; 0.00435 m citric acid; at pH 4.72 (with the hydrogen ions generally provided by an addition of HCl).

Curve B: 2 m sodium nitrite; 2 m ammonium chloride; 0.225 m sodium acetate; 0.075 m hydrogen ion; 0.00435 m citric acid; at pH 4.70.

Curve C: 1 m sodium nitrite; 1 m ammonium chloride; 0.2 m sodium acetate; 0.1 m hydrogen ion; 0.00435 m citric acid; at pH 4.8.

Figure 3:
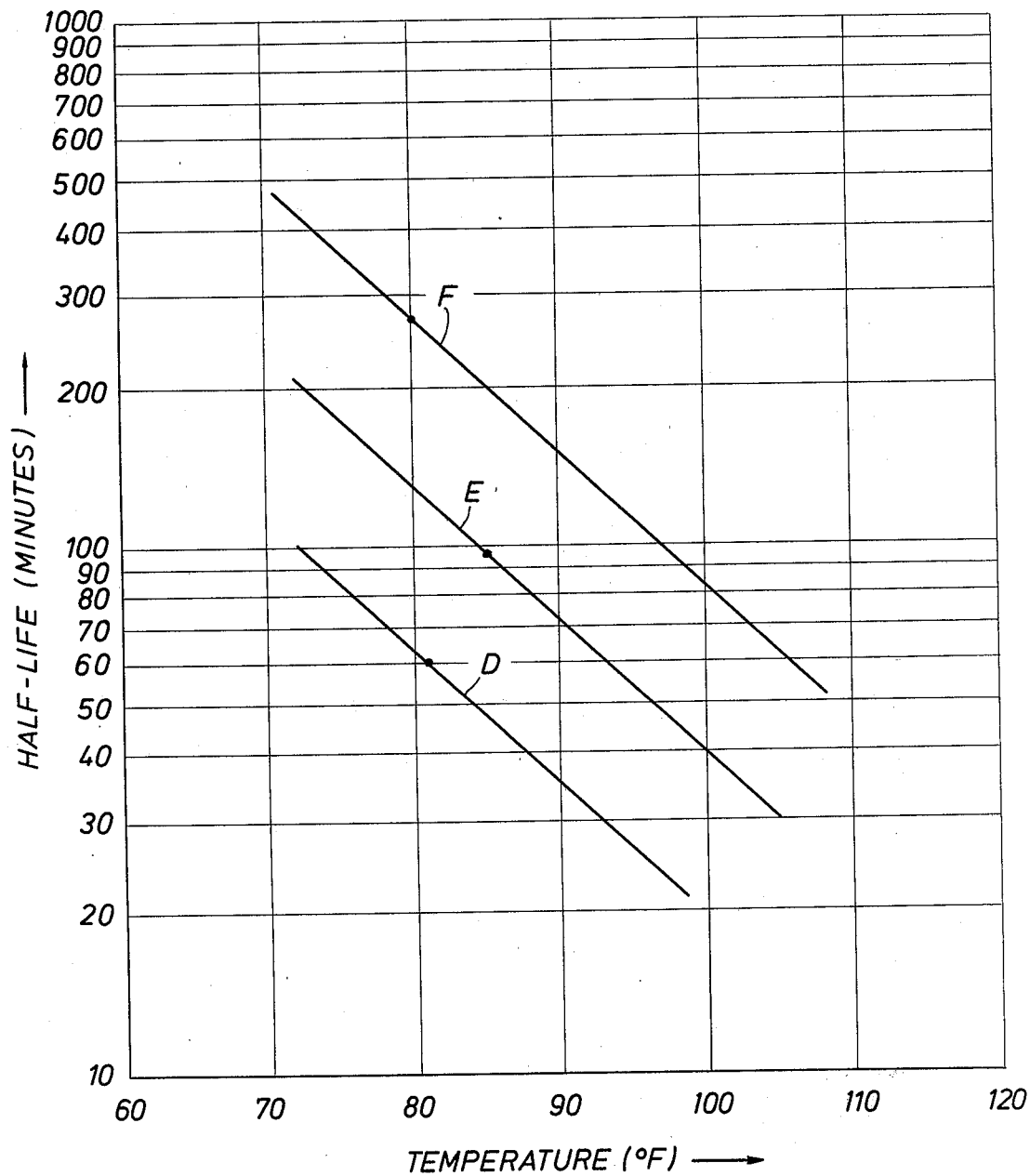

FIG. 3 shows similar graphs of similarly obtained half-lifes versus temperature data. In this case each of the solutions contained 3 moles per liter sodium nitrite, 3 moles per liter ammonium nitrate, 0.2 moles per liter sodium acetate, 0.00435 moles per liter citric acid. The solutions differed only in the amounts of HCl added in order to provide the indicated pH's. The amounts of HCl and pHs of those solutions were:

Curve D, 0.1 m HCl at pH 4.75;
Curve E, 0.05 m HCl at pH 5.13;
Curve F, 0.025 m HCl at pH 5.3.

Figure 4:
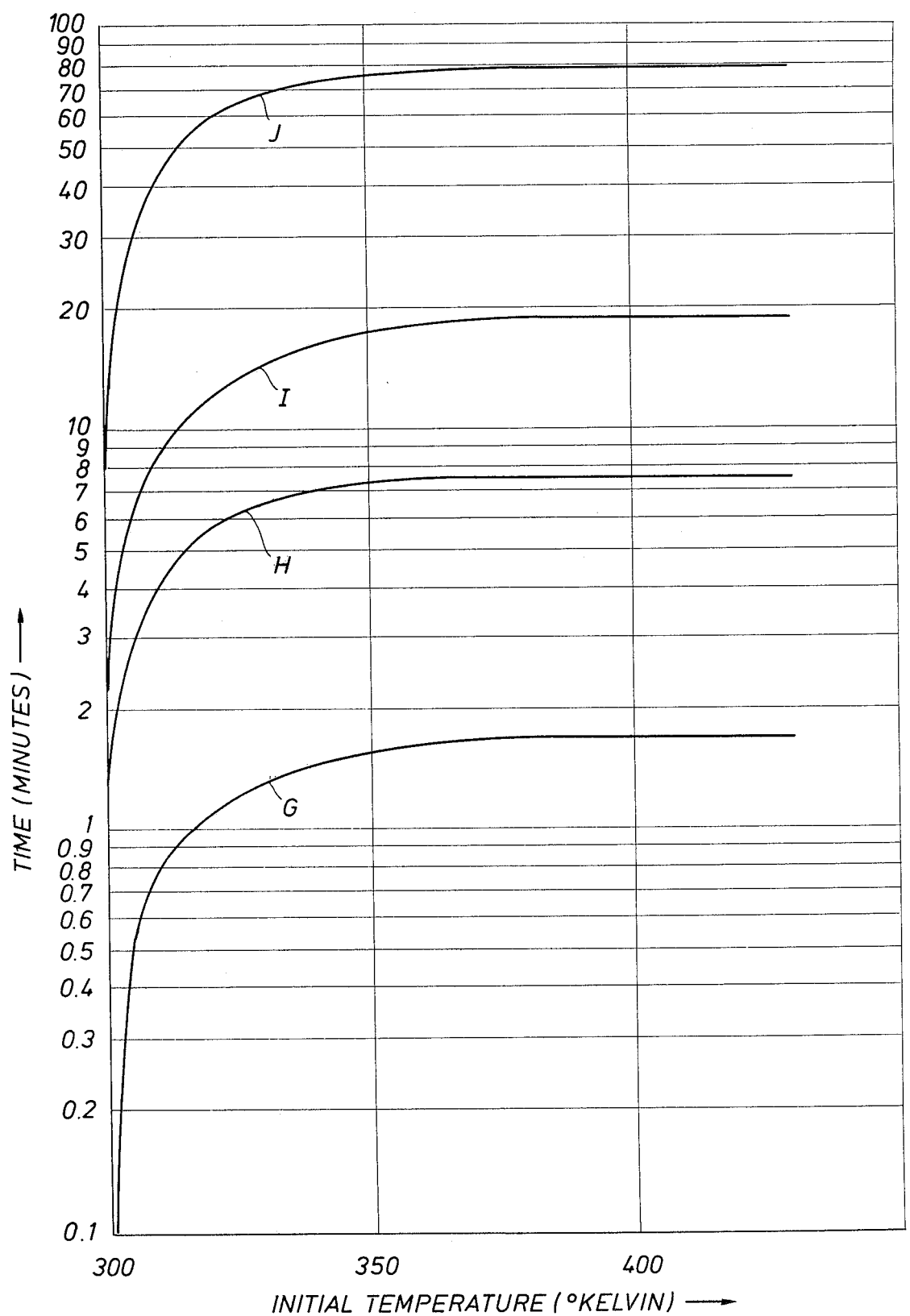
FIGS. 4 and 5 illustrate the variations with time in the amount by which the temperature of various aqueous solutions are increased by reactants suitable for use in the present invention.

FIG. 4 shows plots of the amounts by which a one-liter solution was heated while being maintained adiabatically (for example, in a thermos bottle) at an initial temperature of 300° Kelven (25° C. or 81° F.) versus time in minutes. Each of the solutions represented by the curves G, H, I, J contained (in moles per liter of distilled water): 3 m sodium nitrite; 3 m ammonium nitrate; 0.2 m sodium acetate; 0.00435 m citric acid; and the indicated amount of HCl to provide the indicated initial pH.

Such solutions generate substantial 70,000 calories per mole of reacting ammonium and nitrite ions, or per mole of gaseous nitrogen generated. Therefore, the maximum amount of heat generated by the reactants in each of the solutions would increase the temperature of 1 liter of water by 210° Kelven or Centigrade or 410° F.—which would cause the maximum temperature attainable by each solution to be 510° K., 237° C. or 491° F.

The curve G solution contained 0.1 m HCl and had a pH of 4.73. As indicated in the figure, the reaction of that solution was completed in about 1.7 minutes.

The curve H solution contained 0.5 m HCl and had a pH of 5.13.

The curve I solution contained 0.25 m HCl and had a pH of 5.3.

The curve J solution contained no HCl and had a pH of 5.9.

Figure 5:
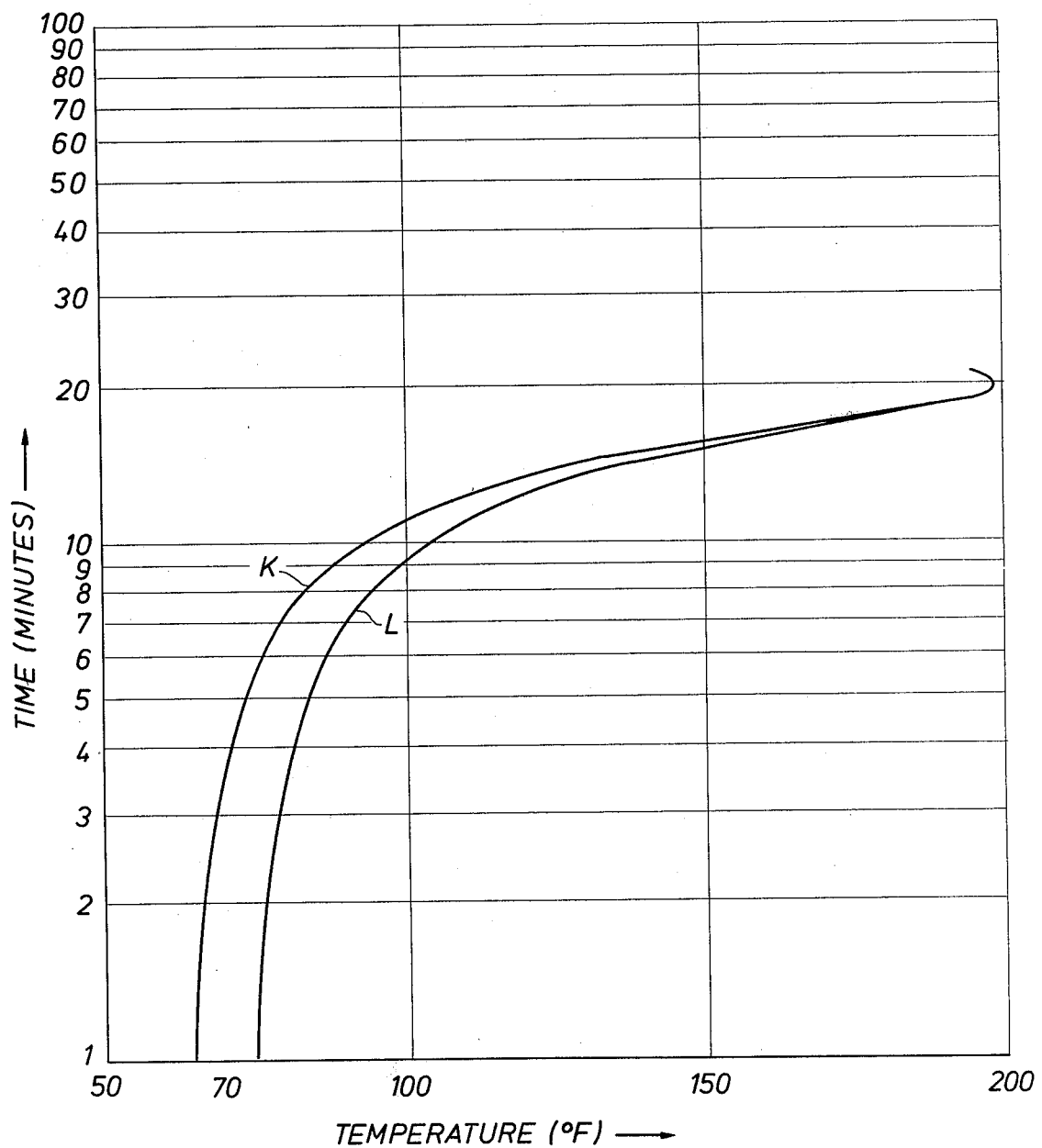

FIG. 5 shows a set of curves similar to those of FIG. 4, relating to 2 molar solutions having slightly differing proportions of buffering materials and different initial temperatures.

The curve K solution contained 2 m sodium nitrite, 2 m ammonium chloride, 0.75 m sodium acetate, 0.75 m acetic acid, 0.0044 m citric acid (which provided a one-to-one buffer system of the acetic acid and its salt). The reacting of this solution was started at 61° F. The curve L solution was identical except for a ratio of 0.15 m to 0.75 m (which provided a one-to-two buffer system of the acetic acid and its salt). Its reaction was started at 71.6° F.

The maximum temperature increase (per liter of water) which could be generated by these solutions was 140° Kelven or Centigrade or 252° F. However, as indicated in the figures, since the solutions were tested in open containers, as the solution temperatures approached the boiling point of water, the heat loss due to vaporization became so great that the trend of the temperature curve was reversed.

If the present type of reservoir heating solutions are employed in a well in which most of the heat is conducted away from the fluid (thus providing substantially isothermal conditions) the rates of reaction and heat generation will be similar to those of FIGS. 2 and 3. However, where the well does not remove a significant amount of the generated heat (thus preventing substantially adiabatic conditions) the relationships of FIGS. 4 and 5 are applicable. In general, in a given well, the situation can be expected to be somewhere between those extremes. Where it is desirable to rather precisely position the depth at which the heat generation is to occur (for example to avoid damaging packers or other heat sensitive equipment in the borehole) conventional logging means and/or analyses of prior well performance can be utilized to determine suitable rates of fluid inflow and the probable heat loss, in order to properly select the reaction rate to use for the heat-generating reaction and the rate at which the reactant-containing solution is pumped into the well.

III-Hypothetical Well Treatment

In a particularly preferred procedure for designing a well treatment, use can be made of the capability of the present reactants to be spotted and kept static in a particular location until they generate substantially all of the heat they are capable of generating. This can provide a hot zone through which the subsequently injected solution can be flowed in a manner causing them to be triggered into a relatively rapid generation of all of the heat they can provide.

An illustration of how such a process might be applied in a well is provided by the following hypothetical procedure.

| | |
|---|---|
| Well conditions: | Injector - 10-foot interval - 100° F. |
| Treatment design: | Heat a 5-foot radius around well bore to 300° F. and sweep all oil and grease away from the well bore. |
| Treatment pumping: | (1) Spot about 20 bbls of 3.0 M/L chemical solution (capable of raising temperature of the solution 400° F.) in the well bore and formation. |
| | (2) Wait about 30 minutes for temperature in the well bore to increase about 50° F. |
| | (3) Pump 100 bbls of 1.5 M/L chemical solution slowly so that all heat will be released immediately on entering the region of the hot well bore (solution is capable of raising temperature 200° F.). |
| | (4) Pump the hot solution-gas mixture thus formed into the reservoir to distribute the heat over a 5-foot radius and sweep the oil and grease from the vicinity of the well bore. |

IV-Laboratory Sand Pack Tests

To obtain data on the rate and amount of heat which is produced while continuously injecting a chemical heating solution into an earth formation, conventional sand packs in high-pressure pipe nipples have been conducted. A small laboratory pumping system was used to blend the formula (chemical solution) as desired prior to entering an air bath to simulate the downhole condition of a well. The fluid enters a small preheater in the air bath and thence into the sand pack. The sand pack is fitted with a thermocouple about one inch into the sand at the inlet. The pipe nipple is well insulated to retain as much heat as possible. The usual sand pack consists of about 250 grams of a well rounded-well sorted sand (No. 5 sand) with a permeability of about 8 darcies and porosity of about 0.35. The pipe nipple weighs about 1800 grams which must be considered when making calculations of the time required to heat the entire system during a run. The fluid (water-oil-gas) leaving the pack is cooled to room temperature before entering a conventional diaphragm-controlled back pressure valve which maintains about 500 psi on the system.

Table I lists data obtained by such sand pack tests when no oil phase was present.

Run No. 1 using a typical low temperature $N_2$ generating solution resulted in an 180° F. rise in pack temperature. This is a little lower than the theoretical rise (about 212° F.).

Run No. 2 was identical to Run 1 except a faster flow rate was used. A value near the theoretical heat rise was obtained, indicating heat losses are probably responsible for the slightly lower values obtained in Run No. 1.

Run No. 3 showed that flow rate must be fairly low to give heating in the inlet of the pack. A flow rate of 12 cc/min. was too fast and caused heating only in the outlet of the pack.

Run No. 4 showed that 80° F. starting temperature was too low for a 1.5 M/L solution; at the flow rates used and the heat losses experienced in the system, insufficient heat was generated to get reaction fast enough to deplete the solution (and release the heat) in the inlet of the pack.

Run No. 5 showed that 80° F. starting temperature was not too low for a 3.0 M/L solution. However, the final maximum temperature developed was much lower than the theoretical maximum of 410° F. This was probably due to heat losses (the 3 cc/min. run was higher than the 2 cc/min. one) and to the loss of $H_2O$ vapor in the $N_2$ gas due to insufficient pressure on the system.

Run No. 6 showed that a 100° F. was too low a starting temperature for a 1.5 M/L solution.

Run No. 7 showed that a 100° F. starting condition could be treated by a 1.5 M/L solution if a little 3.0 M/L solution was flushed through the system first.

Run No. 8 confirmed the above but for an 80° F. pack. In practical application, a cold well will probably be best heated when using 1.5 M/L solution if a short soak period by the first part of the treatment solution is used. This will heat the well bore sufficiently so that a slow pumping rate of the remainder of the solution will maintain a hot well bore thereafter.

Run No. 9 showed that slower reacting solutions could be used for higher (160° F.) bottom hole temperature wells.

Run No. 10 showed that $NH_4Cl$ was as good a source of $NH_4^+$ ions for the reaction as $NH_4NO_3$ used in all other runs above.

Run No. 11 showed that closing in the first one or two pore volumes of treatment in the pack and allowing heating to occur (not shown in Table I) was as effective a means of heating the pack as continuing to flow. This is probably the preferred way to get the well bore hot in field applications as mentioned previously.

During the above runs, the rate of gas production was monitored at all times to be sure the solution was completely spending in the pack. In most cases, spending was essentially instantaneous on entering the pipe nipple (after sufficient heating had occurred) as illustrated by the near theoretical (see Run 2/20/80) temperature rise experienced one inch from the sand inlet face.

TABLE I

TEMPERATURE RISE IN PACK DUE TO CONTINUOUS FLOW OF $N_2$ GENERATION SOLUTION

| Run No. | Date | Solution | Starting T - °F. | Flow Rate cc/min. | Time of Treatment Minutes | Temperature Rise in Pack Inlet[1] cc | Fraction of Stoichiometric Gas Generated in Pack | Back Pressure on Sand Pack, psi |
|---|---|---|---|---|---|---|---|---|
| 1 | 2/13/80 | 1.5 - A[2] | 115 | 3 | 191 | 82 | 1.0 | 500 |
| 2 | 2/14/80 | 1.5 - A | 115 | 6 | 145 | 101 | 1.0 | 500 |
| 3 | 2/14/80A | 1.5 - A | 115 | 12 | 103 | 91[3] | 0.84 | 500 |
|   |   |   | — | 9 | 45 | 86[4] | 0.79 | 500 |
| 4 | 2/15/80 | 1.5 - A | 80 | 2 | 60 | no response |   | 500 |
|   |   |   | — | 4 | 55 | no response |   |   |
| 5 | 2/15/80A | 3.0[5] - A | 80 | 2 | 200 | 123 | 1.0 | 500 |
|   |   |   | — | 3 | 102 | 155 | 1.0 | 500 |
| 6 | 2/19/80 | 1.5 - A | 100 | 2 | 115 | 25 | .72 | 500 |
| 7 | 2/20/80 | 3.0 - A | 100 | 2 | 30 | switch to 1.5 M/L solution |   | 500 |
|   |   | 1.5 - A | — | 2 | 180 | 82 | 1.0 | 500 |
|   |   |   |   | 3 | 240 | 98[6] | 1.0 | 900 |
| 8 | 2/21/80 | 3.0 - A | 30 | 2 | 30 | switch to 1.5 M/L solution |   | 500 |
|   |   | 1.5 - A | — | 2 | 126 | 80 | 1.0 | 500 |
| 9 | 2/22/80 | 3.0 - B[7] | 160 | 2 | 384 | 145 | 1.0 | 500 |
| 10 | 2/25/80 | 3.0 - C[8] | 160 | 2 | 384 | 145 | 1.0 | 500 |
|   |   |   | — | 4 | 120 | 163[9] | 1.0 | 500 |
| 11 | 2/26/80 | 3.0 - C | 160 | 4 | 15 | closed in to generate heat for 20 minutes |   |   |
|   |   |   | — | 4 | 50 | 163 | 1.0 | 500 |

[1]Thermocouple is about 1" downstream of sand pack inlet face.
[2]1.5 M/L $NaNO_2$ + 1.5 M/L $NH_4NO_3$ + .2 M/L Na acetate + .1 M/L HCl, pH = 4.5, $t_{\frac{1}{2}}$ = 60 min. at 115° F. Maximum temperature rise at 70 kcal/mol = 105° C.
[3]Outlet only - inlet did not heat up.
[4]Inlet heating slightly to about 34° C.
[5]Solution like 1.5 - A but 3 M/L $NH_4NO_3$ and $NaNO_2$. Maximum temperature rise at 70 kcal/mol = 210° C.
[6]This value is the maximum possible considering heat losses in the preheater to the pack.
[7]3.0 M/L $NaNO_2$ + 3.0 M/L $NH_4NO_3$ + 0.5 M/L Na Acetate, $t_{\frac{1}{2}}$ = 160 min at 160° F.
[8]Like 3.0 - B but $NH_4Cl$ in place of $NH_4NO_3$.
[9]$SiO_2$ in effluent = 81 ppm.

Table II lists data obtained by similar sand pack tests relative to removing various heavy hydrocarbons from the sand packs.

Run No. 1, starting with about 50% of the pore space filled with Shell MP grease showed about 75% removed during the treatment. The maximum temperature attained was about 196° F.

Run No. 2, starting with about 50% of the pore space filled with Kern River crude showed essentially none removed at 162° F. in 245 minutes. Adding a surfactant (Howco Suds) greatly accelerated oil removal and caused much plugging of the outlet lines in the system. All efforts to heat the inlet failed as the foam appeared to cause channeling and by-passing of the solution. The retention time in the inlet of the pack was thus decreased and much cooling occurred. Overall, approximately 82% of the oil was removed from the pack as shown.

Run No. 3, starting with about 50% of the pore space filled with Peace River tar showed essentially no removal at 149° F. in 250 minutes.

which were compounded and mixed in accordance with the following instructions:

| Solution A (50 bbl) | |
|---|---|
| Fresh water (0.42 bbl/bbl) | 42 bbl. |
| Sodium Nitrite (75 lb/bbl; 3 M/L) | 7500 lb. |
| Solution B (50 bbl) | |
| Fresh Water (0.33 bbl/bbl) | 33 bbl. |
| Ammonium Nitrate (91 lb/bbl; 3 M/L) | 9100 lb. |
| Sodium Acetate (6.1 lb/bbl; 0.2 M/L) | 610 lb. |
| Citric Acid (0.33 lb/bbl; 0.00435 M/L) | 33 lb. |
| Inhibitor (A-186, or equivalent) (0.11 gal/bbl) | 11 gal. |
| Hydrochloride Acid (37%) | 1.5 gal. |

Mixing Instructions

Solution A: Place 40 bbl. fresh water in tank. Add 7500 lb. Sodium Nitrate. Add fresh water to yield 50 bbl. Mix thoroughly to dissolve. NOTE: Mix A solution first.

Solution B: Place 30 bbl. fresh water in tank. Add 9100 lb. Ammonium Nitrate. Mix thoroughly to dissolve. Circulate through 5 micron dual Pico filters a minimum of 4 volumes or until clear. Add 610 lb. sodium acetate, 33 lb. citric acid, 11 gal. inhibitor, and 1.5 gal. 37% HCl. Add fresh water to yield 50 bbl. Mix thoroughly to dissolve.

TABLE II

REMOVAL OF HEAVY CRUDE AND GREASE FROM A SAND PACK

Conditions:
(1) Solutions and start up procedure as shown in Run 2/21/80
(2) Starting T °F. = 115
(3) Heavy crude or grease is 8% by weight of sand in pack (~50% of pore space filled with hydrocarbon) at start of treatment.

| Run No. | Date | Hydrocarbon | Flow Rate cc/min. | Time of Treatment Minutes | Temperature Rise in Pack Inlet, °C. | Hydrocarbon in Pack after Treatment, % by wt. of Sand | | |
|---|---|---|---|---|---|---|---|---|
| | | | | | | Inlet | Middle | Outlet |
| 1 | 2/28/80 | MP Grease (SHELL) | 2 | 262 | 63 | | | |
| | | | 4 | 120 | 91 | 2.0 | 2.4 | 2.6 |
| 2 | 3/3/80 | Kern River Crude - oil injected 8/1/79 | 2 | 245 | 72 | only trace of oil removed | | |
| | | | 2[1] | 180 | —[2] | outlet line plugged | | |
| | | | over night soak in tap water | | | | | |
| | | | 2 | 115 | 65 | outlet lines plugged | | |
| | | | 2 | 20[3] | continued cooling | outlet lines plugged[4] | | |
| | | | 2 | 180[5] | 93 | 1.1 | 1.1 | 2.0 |
| 3 | 3/6/80 | Peace River Tar | 2 | 250 | 65 | only trace tar removed | | |
| | | | 2 | 120[6] | 65 | | | |
| | | | 2 | 90[7] | 90 | 6.8 | 4.6 | 5.6 |

[1]Added .5% Howco Suds (Foaming agent).
[2]Oil started coming out immediately, inlet temperature decreased rapidly after about 30 minutes and outlet line from pack plugged badly with heavy oil.
[3]Switched to 3 M/L solution to try to increase heat.
[4]Removed plugging with acetone flush of outlet lines and water flush of core.
[5]Switch to 1.5 M/L solution (no Howco Suds) after unplugging lines.
[6]Added 0.5% Howco Suds.
[7]3.0 M/L solution to get more heat - after overnight shut-in lines were plugged and test discontinued.

V-Well Treatment

The present invention was used in a well which was completed as a producing well in a heavy oil reservoir in which a steam flood was being conducted. However, after flowing 100% salt water for about four months at an average rate of 50 BWPD, the well was shut in. It was uncertain whether the failure to produce oil, which was being produced by nearby wells, was due to this well being isolated by a sealing fault or due to an extremely low relative oil mobility due to a localized anomalously high oil viscosity or some other reason.

In this well the reservoir was located between about 1412 to 1426 feet and had a temperature of 92° F. The wellbore contained heat sensitive elements of a sucker rod pumping unit at a depth of about 1300 feet. It was decided to try a heat treatment similar to that described under the subheading "I-Well Treatment" by a procedure arranged to heat a near-well zone in the reservoir to about 450° without increasing the temperature in the well at or above the location of the pump elements.

About 100 barrels of a treating solution made up by mixing about 50-barrel portions of solutions A and B The resultant treating solution was substantially the same as that used in the previously described well treatment—except for the presence of a significantly smaller proportion of hydrochloric acid.

Figure 6:
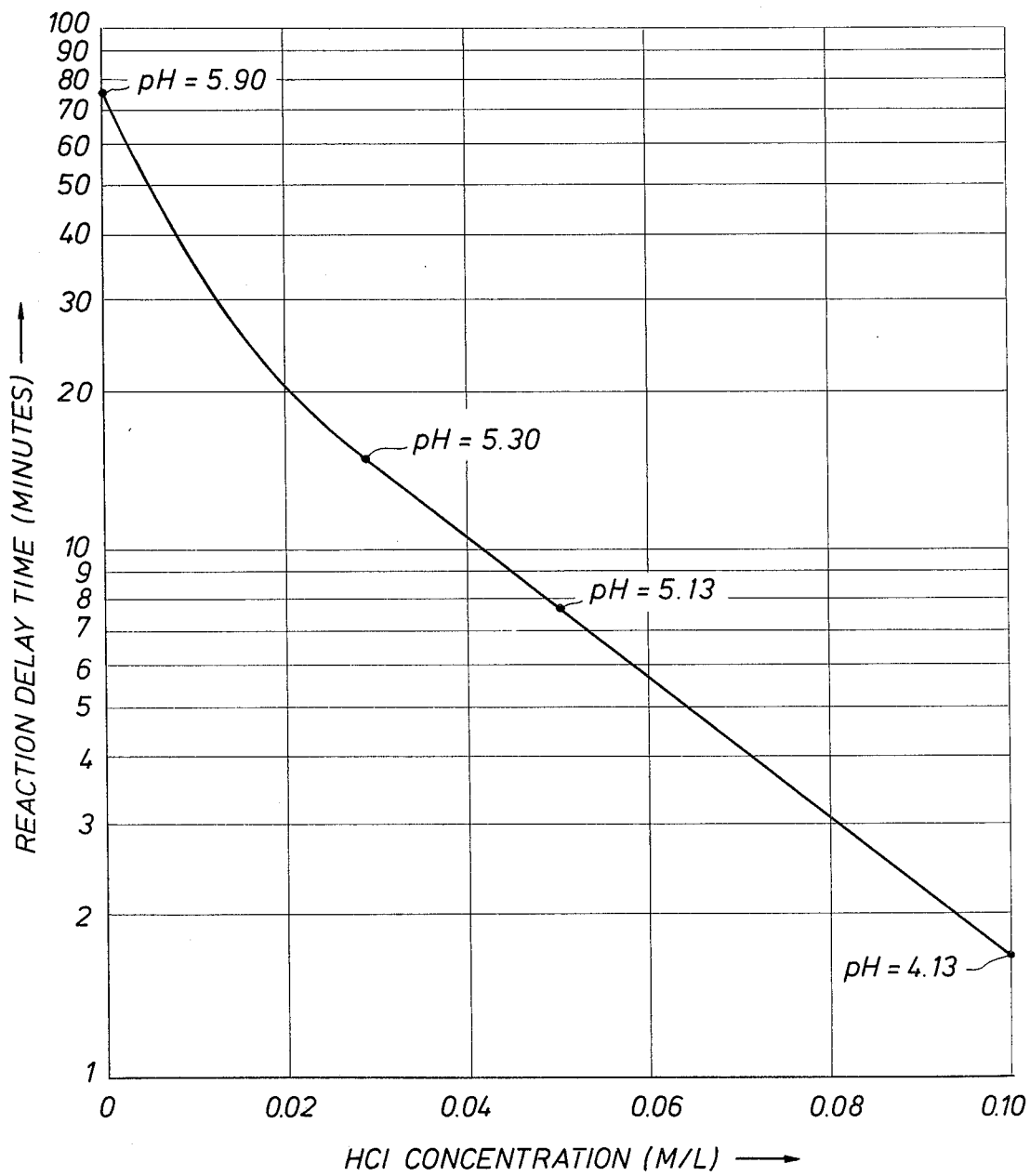
FIG. 6 shows the variation in delay time with varying concentration of HCl in a particularly suitable reactive solution for use in the present invention.

FIG. 6 shows a graph of how a reaction delay time decreases with increase in concentration of HCl. Such a reaction delay time relates to how long it takes for a relatively rapid rise in temperature to occur within a treating solution of the present invention while the solution is kept within a container having a relatively low heat loss. The data in FIG. 6 relates to an aqueous solution which contained (in terms of moles per liter, M/L) 3 M/L of each of ammonium nitrate and sodium nitrite, 0.2 M/L sodium acetate, 0.00435 M/L citric acid, the indicated amounts of HCl, and had an initial temperature of 80° F. Such data can be used to formulate such a treating solution or to confirm the capability of a solution compounded at a well site to delay the onset of the chemical heating until the solution had flowed down through the well to a selected depth, such as a depth below that of a heat-sensitive element.

In the well to be treated, the well conduits were sized and arranged so that fluid could be injected through the annular space surrounding the tubing string and the portion of that space extending from a surface location to the depth of the pump element contained about 44 barrels of liquid. A pump rate of about one barrel per minute was known to be suitable for injecting fluid through that well and into the reservoir.

In designing the treating fluid, it was decided that (a) injecting 50 barrels of liquid would adequately displace the annular fluid above the pump and cause the frontal portion of the fluid being injected to move below the depth of the pump and (b) the average temperature of the fluid being injected would be about 80° F. FIG. 6 relates to the proportion of HCl needed to provide a reaction delay time of 50 minutes for such an injection of the treating solution described above. It is apparent from that graph that a reaction delay time of 50 minutes (to provide for the injecting of 50 barrels of liquid at 1 barrel per minute) would require an HCl concentration of about 0.004 moles per liter—which amount corresponds to the specified 1.5 gallons of 37% HCl.

In preparing the well for treatment, the pump sucker rods were detached from the pumping unit and pulled out of the tubing string. A temperature recorder was run into the tubing string and kept stationary at a depth near that of the pump element. Then, the 100 barrels of the treating solution were pumped in through the annulus and subsequently displaced with about 44 barrels of filtered salt water to ensure that substantially all of the treating solution entered the reservoir formation. During this treatment it was plainly apparent that considerable heat and gas were generated in and adjacent to the reservoir. But, the temperature recorded at a depth near that of the pump elements showed that only a relatively minor rise, of less than about 10 degrees, occurred at that location. After being kept shut-in for about 3 days, the well was returned to production. The produced fluid appeared to contain oil. After about 3 days after the treatment the well was tested and a trace of oil was found.

A graph of the type shown in FIG. 6 can be readily prepared by simply mixing a selected volume of the present type of nitrogen gas-generating solution and maintaining it within a thermos bottle while noting its temperature at intervals of time such as 1 minute. The onset of a rapid acceleration of the exothermic gas-generating reaction is clearly demarked by a rapid temperature rise; such as more than about 100° F. within a minute or less.

In a preferred procedure for conducting well treatments in accordance with the present invention, samples of the respective ammonium ion-containing and nitrite ion-containing solutions as prepared at the well site are mixed in the proportions in which they are to be mixed to provide the treatment solution to be injected. The resulting solution is placed within a thermos bottle at an initial temperature equalling the average temperature the solution will encounter within the well. The temperature of the solution is measured periodically to determine whether the buffering of that solution and/or rate of its injection should be adjusted to cause the heating to occur at the selected location within the well or reservoir.

The nitrogen-containing gas-forming reactants which are suitable for use in the present process comprise water-soluble inorganic ammonium oil-containing compounds which are relatively reactive at substantially ambient temperatures and are capable of reacting with an oxidizing agent within an aqueous medium to yield nitrogen gas and a substantially inert, relatively low-density, oil-immiscible aqueous saline solution. Examples of suitable ammonium ion-containing compounds include the ammonium salts of halogen acids, such as ammonium chloride; such salts of nitric, sulphuric, and nitrous acids and the like acids. Where available, ammonium nitrite can be utilized to provide both the ammonium ion and the nitrite ion, if the ambient temperatures are such that an undesirable extent of reaction does not occur while the compound is being dissolved in an aqueous liquid.

The oxidizing agents suitable for use in the present process comprise substantially any water soluble salts of nitrous acid which are compatible with and capable of reacting with the ammonium ion-containing compound within an aqueous medium to form nitrogen gas and a relatively low-density, oil-immiscible, aqueous saline solution. The alkali metal or ammonium nitrites are particularly suitable.

Aqueous liquids suitable for use in the present invention comprise substantially any in which the salt content does not, for example by common ion effect, prevent the dissolving of the desired portions of ammonium ion and nitrite ion-containing reactants. In general, substantially any relatively soft fresh water or brine can be utilized. Such aqueous liquids preferably have a dissolved salt content of less than about 2000 ppm monovalent salts and less than about 100 ppm multivalent salts.

In general, compositions such as aqueous liquids, foam-forming surfactants, water thickening agents and the like, which are suitable for use in the present process can comprise substantially any of those disclosed in the U.S. Pat. No. 4,178,993.

Buffering compounds or systems which are suitable for use, if desired for moderating or accelerating the rate of gas generation, can comprise substantially any water-soluble buffer which is compatible with the gas-forming components and products and tends to maintain a pH of an aqueous solution of the selected ammonium ion and nitrite ion-containing compounds and a slightly acidic pH at which the reaction proceeds at a suitable rate at the ambient surface temperature. Where the reaction rate is significantly rapid at the surface temperature at the well site, the ammonium ion-containing and nitrite ion-containing compounds are preferably dissolved (for example, at substantially twice the selected molar concentration) in separate aqueous liquids which are pumped by separate pumps so that they are combined within a pipe or container maintained at the injection pressure at which the gas-generating liquid solution is injected into the well. In general, a suitable pH at which to buffer the gas-generating solution is from about 4.0 to 7. Examples of suitable buffering materials include the alkali metal salts of weak acids such as carbonic, acetic, citric and the like acids.

As described in greater detail in the above mentioned U.S. Pat. No. 4,178,993, it is generally desirable to use substantially equimolar proportions of ammonium and nitrite ions, particularly when using concentrations in the order of from about 1 to 6 moles per liter of gas-generating reactants. The disclosures of U.S. Pat. No. 4,178,993 are incorporated herein by cross-reference.

As will be apparent to those skilled in the art, the concentrations at which the individual ammonium ion-containing and nitrite ion-containing solutions can be combined to form the nitrogen-gas-generating solution can be varied to suit the solubility properties of the compounds containing those ions and the proportions in which such solutions are to be combined. For example, if the ammonium ion-containing compound is the least soluble compound, it can be dissolved at a molarity less than twice the molarity selected for the treating solution and then mixed, in a greater than equal proportion, with a smaller than equal proportion of a more concentrated solution of the more soluble compound, in order to combine the reactants in stoichiometric proportion. Of course, in various situations, a less than stoichiometric molecular proportion of the less soluble reactant can be combined with an excess of the more soluble reactant. The rate at which the treating solution is injected into the well can be continuous or intermittant or can be varied substantially as desired as long as the rate of injection is correlated with the rate of the reaction within the treating solution, in the manner as described above. For example, a first portion of the treating solution can be injected and stopped in order to heat up a selected portion of the well or reservoir and/or the concentration of the reactants and/or rate at which the reactants react can be varied in order to impact more or less heat at a selection location within the well or reservoir.

In general, the determinations of the currently existing properties such as the temperature or volume or injectivity of the well and reservoir to be treated can be conducted or ascertained by logging or measuring procedures such as those currently available and/or by previous experience in the same or an adjacent well. The temperatures provided by the present heating procedure at a particular downhole location can be monitored during the treatment by means of conventional tools and, at least to some extent, such temperatures can be varied by varying the rate at which the nitrogen-gas-generating solution is injected.

What is claimed is:

1. A well treating process for treating an oil and water-containing reservoir encountered by a well comprising:

selecting a treatment temperature to which a selected zone within the reservoir is to be heated;

selecting a volume of liquid which is at least sufficient to substantially fill all of the water-occupied volume within the selected zone;

selecting a fluid flow rate at which such a volume of liquid can be flowed through the well and into the reservoir without requiring an undesirably long time or hydraulically damaging the well or reservoir;

compounding sufficient aqueous liquid solution to provide the selected volume of liquid so that substantially every portion of the solution contains enough dissolved heat and nitrogen gas-generating reactive components to heat that portion to a temperature at least substantially equalling the selected treatment temperature;

using as said reactive components a mixture consisting essentially of (a) at least one each of water-soluble compounds which contain ammonium ions and nitrite ions and react exothermally within an aqueous solution to generate nitrogen gas and (b) at least one buffering material for maintaining a selected pH which controls the rate of that reaction;

arranging the pH at which each portion of said solution is buffered so that during the flowing of the solution through the well and into the reservoir at the selected rate of fluid flow, the rate of the reaction within each portion of the solution is such that at least most of the gas and heat it can generate is generated after, but relatively soon after, that portion has reached a selected depth; and, flowing said solution through the well and into the reservoir at substantially the selected rate of flow and in a manner such that at least most of the gas and heat generated by each portion of the solution are generated below the selected depth and are conveyed into the selected zone within the reservoir so that it is heated to substantially the selected temperature.

2. The process of claim 1 in which at least one relatively small portion of said aqueous liquid solution is flowed through the well until it flows below a selected depth, is kept relatively static for time enough for it to generate a significant proportion of heat, and then is displaced into or farther within the selected zone to be heated.

3. The process of claim 1 or 2 in which the reservoir oil is relatively viscous, the well being treated is a producing well and, after at least about one day following the treatment, the well is returned to production.

4. The process of claim 1 or 2 in which it is desired to maintain a temperature lower than the selected treatment temperature within the well at substantially all locations above a selected depth and the buffering of substantially all portions of the reactant-containing aqueous liquid solution is arranged to delay the onset of a relatively rapid chemical heating until each portion of that solution has moved below the selected depth.

5. The process of claim 4 in which the buffering of the reactant-containing aqueous liquid solution is capable of causing the rate at which the solution is heated to remain relatively slow and accelerate relatively slowly for a time at least substantially as long as the time required for a liquid to be pumped through the well at said selected rate from a surface location to a depth at least substantially as low as said selected depth when said solution is disposed within a container having a relatively insignificant rate of heat loss at an initial temperature substantially equalling the average temperature to which a solution is subjected when it is flowed through the well from a surface location to said selected depth.

* * * * *